United States Patent
Lee et al.

(10) Patent No.: US 6,766,896 B1
(45) Date of Patent: Jul. 27, 2004

(54) SCRAPING DEVICE

(75) Inventors: Jui-Shan Lee, Ping-Tung Hsien (TW); Ming-Shui Pan, Kaohsiung Hsien (TW); Sheng-Tuan Chu, Feng-Shan (TW)

(73) Assignee: China Steel Corporation, Kaohsiung (TW)

( * ) Notice: Subject to any disclaimer, the term of this patent is extended or adjusted under 35 U.S.C. 154(b) by 0 days.

(21) Appl. No.: 10/400,953

(22) Filed: Mar. 27, 2003

(51) Int. Cl.[7] ............................................... B65G 45/00
(52) U.S. Cl. ..................................... 198/497; 198/499
(58) Field of Search ................................ 198/497, 635, 198/637, 499

(56) References Cited

U.S. PATENT DOCUMENTS

| | | | | |
|---|---|---|---|---|
| 265,528 A | * | 10/1882 | Mathews | 198/497 |
| 3,202,260 A | * | 8/1965 | Wolf | 198/560 |
| 4,529,084 A | * | 7/1985 | Zhang | 198/499 |
| 4,850,474 A | * | 7/1989 | Schwarze | 198/499 |
| 5,014,844 A | * | 5/1991 | Anttonen | 198/499 |
| 5,082,106 A | * | 1/1992 | Schwarze | 198/499 |
| 5,518,107 A | * | 5/1996 | Schwarze | 198/499 |
| 5,573,102 A | * | 11/1996 | Puchalla | 198/497 |
| 5,865,294 A | * | 2/1999 | Betz | 198/497 |
| 6,213,287 B1 | * | 4/2001 | Juracko | 198/499 |
| 6,293,545 B1 | * | 9/2001 | Hanks et al. | 271/311 |
| 6,354,428 B1 | * | 3/2002 | Gibbs et al. | 198/497 |
| 6,581,754 B2 | * | 6/2003 | Law | 198/499 |
| 6,638,062 B1 | * | 10/2003 | Davidson | 432/225 |

* cited by examiner

*Primary Examiner*—Douglas Hess
(74) *Attorney, Agent, or Firm*—Merchant & Gould, P.C.

(57) ABSTRACT

A scraping device for cleaning a conveyer belt, which has an upper forwarding section and a lower returning section includes an elongated positioning member and a plurality of scraping plates. The positioning member is mounted under the lower returning section in a transverse direction transverse to a longitudinal direction of the conveyer belt. Each of the scraping plates includes a mounting part mounted on the positioning member, and at least one web part having a free edge distal from the mounting part. The web part extends between the mounting part and the free edge, and is inclined with respect to the transverse and longitudinal directions. The web part further has a top scraping edge adapted to scrape the conveyer belt.

8 Claims, 9 Drawing Sheets

SCRAPING DEVICE

BACKGROUND OF THE INVENTION

1. Field of the Invention

The invention relates to a scraping device, more particularly to a scraping device adapted for cleaning a conveyer belt.

2. Description of the Related Art

Referring to FIG. 1, a conventional scraping device 2 is shown for cleaning a conveyer belt 10 of a conveyer 1. The conveyer belt 10 circulates in a direction indicated by the arrows shown in the figure, and includes an upper section 101 and a lower section 102. The scraping device 2 includes a fixing base 21 mounted under the conveyer belt 10, a positioning block 22 removably mounted on the fixing base 21, and a scraping member 23 connected to the positioning block 22 and abutting against the lower section 102 of the conveyer belt 10. Material (such as cement, sand, or the like) adhered on the conveyer belt 10 can be scraped by the scraping action of the scraping member 23 on the lower section 102 of the conveyer belt 10.

However, the aforesaid scraping device 2 has the following shortcomings in practice:

1. The conveyer belt 10 is liable to vibrate during operation. If the vibration occurs at the part of the conveyer belt 10 passing across the scraping member 23, the material adhered on the part of the conveyer belt 10 will not be scraped. Therefore, the scraping efficiency of the aforesaid scraping device 2 is not sufficient.

2. The scraping member 23 is liable to be abraded due to the continuous scraping action. Therefore, it: is necessary to replace the scraping member 23 frequently, which in turn results in increased costs.

3. The aforesaid conventional scraping device 2 can not be used for cleaning a conveyer belt operating in a reversible direction. If the conveyer belt 10 circulates in a direction counter to the direction shown by the arrows in FIG. 1, the scraped material is liable to accumulate between the scraping member 23 and the positioning block 22, which will result in damage to the conveyer belt 10 due to the friction between the conveyer belt 10 and the accumulated material.

Referring to FIG. 2, another conventional scraping device 3 is shown to include a base 31 and a rotary scraping member 32 journalled on the base 31. The rotary scraping member 32 includes a plurality of scraping brushes 33 mounted along an axial direction of the rotary scraping member 32 and spaced apart from each other. The scraping device 3 is electrically actuated to scrape the material adhered on conveyer belt 10 through the scraping brushes 33.

However, since the scraped material is liable to be suspended in air during the scraping operation, the recovery efficiency of the scraped material is not sufficient. Moreover, since the scraping device 3 is actuated by electrical power, it consumes energy and is not economical. Additionally, since there are spaces between the scraping brushes 33, it is difficult to scrape all of the material from the conveyer belt 10 efficiently. Furthermore, if the material intended to be scraped is moist, the material is liable to adhere to each other and to cumulate in the spaces between the scraping brushes 33. Therefore, the conveyer belt 10 is liable to be damaged, and the scraping efficiency of the scraping device 3 is lowered.

SUMMARY OF THE INVENTION

The object of the present invention is to provide a scraping device which enhances the efficiency for cleaning a conveyer belt.

According to this invention, a scraping device, which is adapted for cleaning a conveyer belt having an upper forwarding section and a lower returning section, includes an elongated positioning member and a plurality of scraping plates.

The elongated positioning member is mounted under the lower returning section in a transverse direction transverse to a longitudinal direction of the conveyer belt. Each of the scraping plates includes a mounting part mounted on the positioning member, and at least one web part having a free edge distal from the mounting part. The web part extends between the mounting part and the free edge, and is inclined with respect to the transverse and longitudinal directions. The web part further has a top scraping edge adapted to scrape the conveyer belt.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
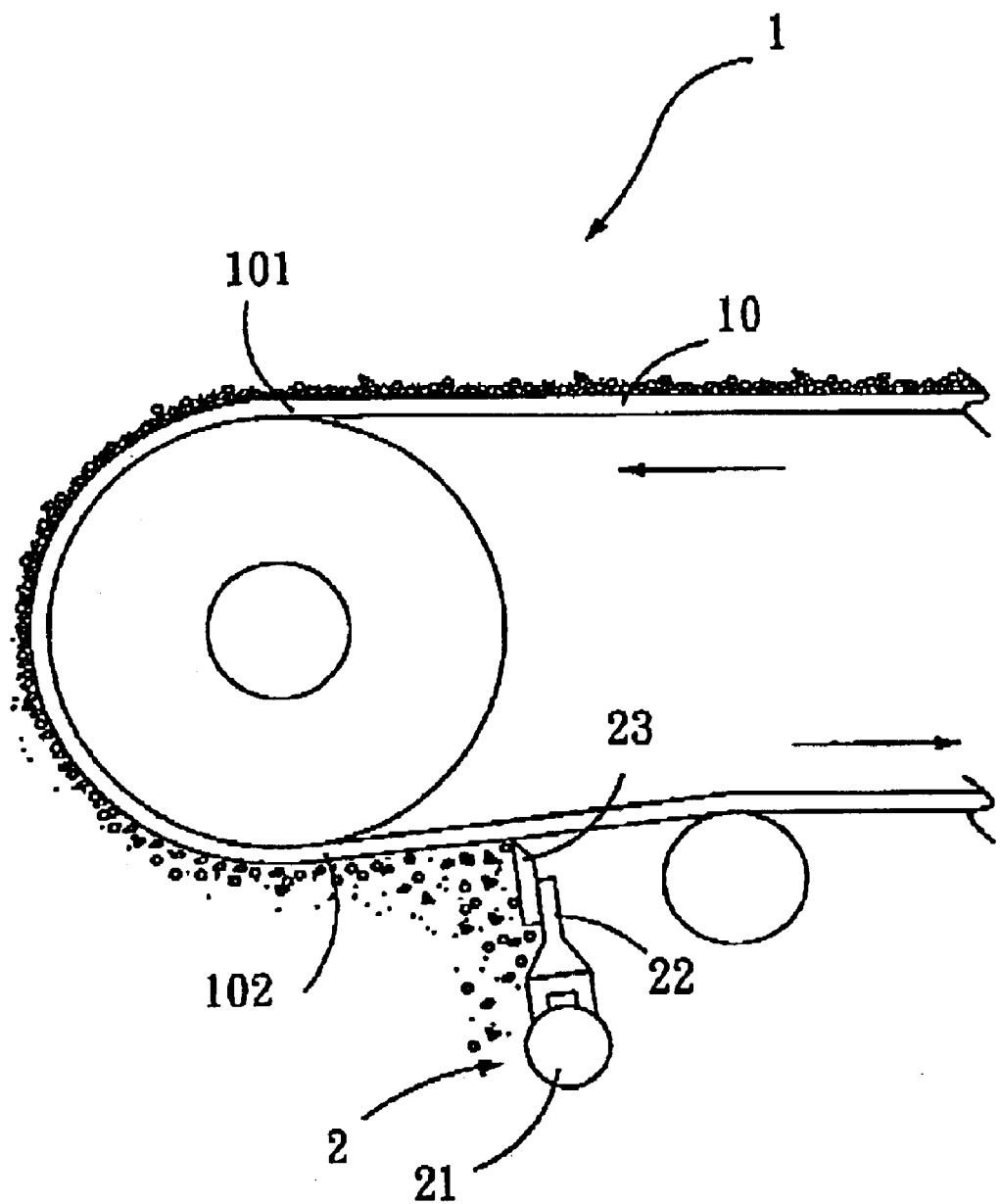
FIG. 1 is a fragmentary side view of a conventional scraping device when applied to clean a conveyer belt.
Figure 2:
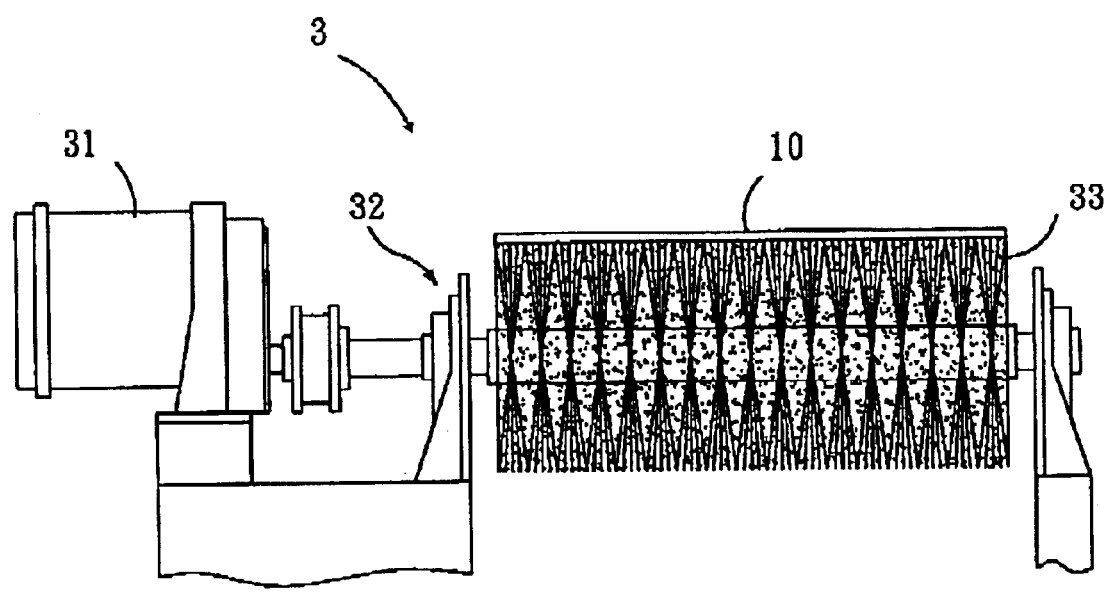
FIG. 2 is a fragmentary schematic view of another conventional scraping device when applied to clean a conveyer belt.

Before the present invention is described in greater detail, it should be noted that like elements are denoted by the same reference numerals throughout the disclosure.

Figure 3:
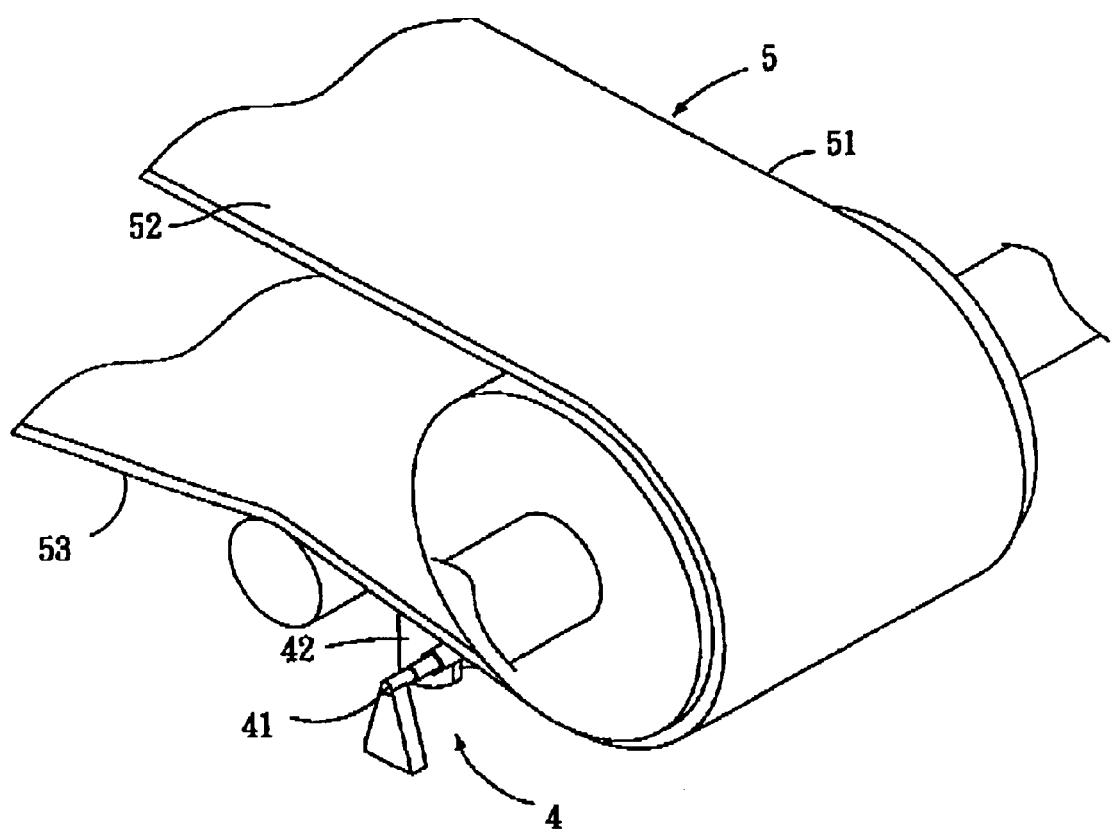
FIG. 3 is a fragmentary perspective view of the first preferred embodiment of the scraping device according to this invention when applied to clean a conveyer belt.
Figure 4:
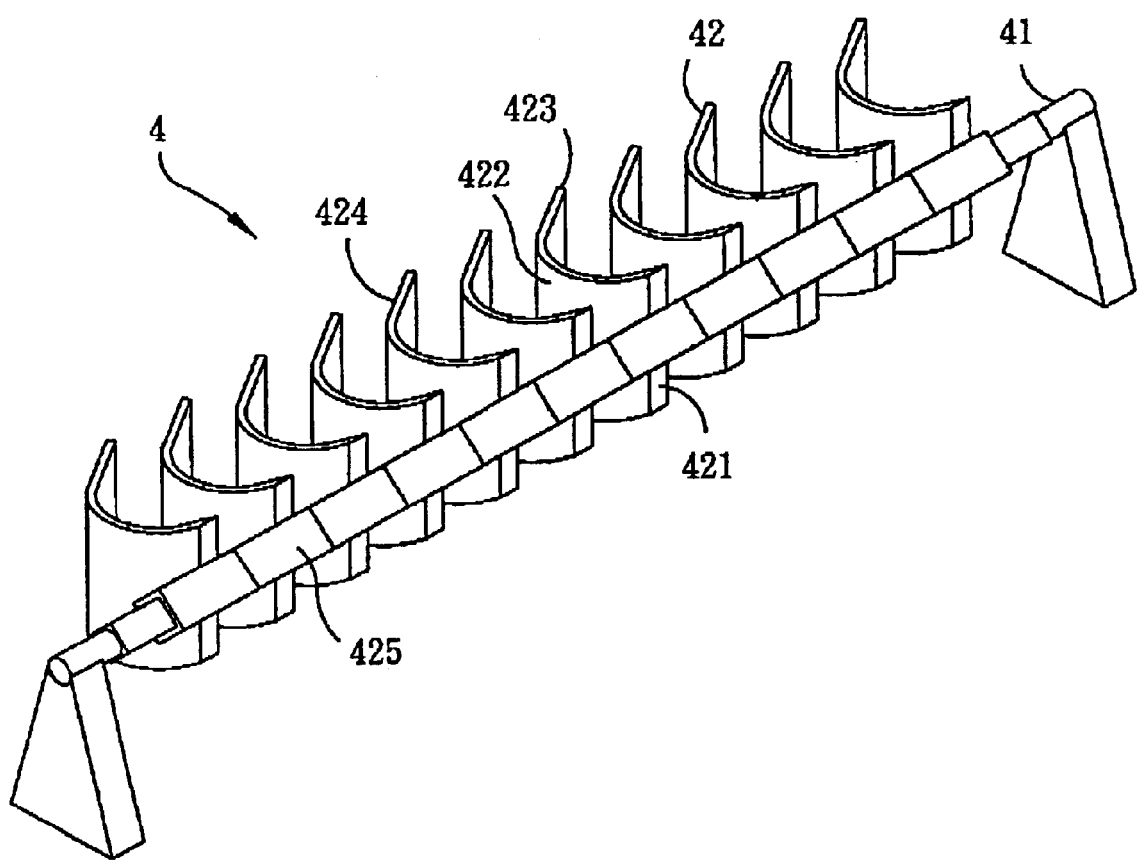
FIG. 4 is a perspective view of the first preferred embodiment.

Referring to FIGS. 3 and 4, the first preferred embodiment of the scraping device 4 according to this invention is shown to be applied for cleaning a conveyer belt 51 of a conveyer 5. The conveyer belt Si is in the form of an endless loop, and has an upper forwarding section 52 and a lower returning section 53. The scraping device 4 includes an elongated positioning member 41 and a plurality of scraping plates 42.

The elongated positioning member 41 is mounted under the lower returning section 53 in a transverse direction transverse to a longitudinal direction of the conveyer belt 51. Each of the scraping plates 42 includes a mounting part 421 mounted on the positioning member 41, and a web part 422 having a free edge 423 distal from the mounting part 421. The web part 422 extends between the mounting part 421 and the free edge 423, and is inclined with respect to the transverse and longitudinal directions. The web part 422 further has a top scraping edge 424, which abuts against the lower returning section 53 of the conveyer belt 51 during the cleaning operation so as to scrape the conveyer belt 51.

Figure 5:
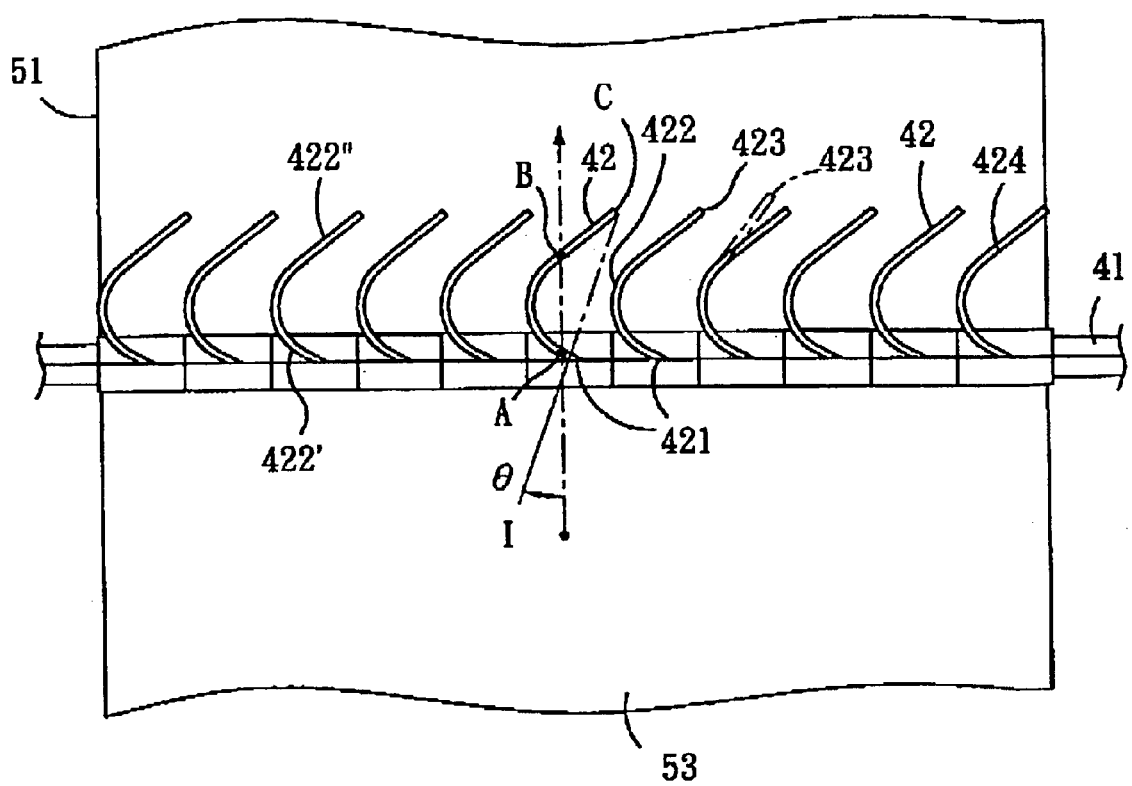
FIG. 5 is a fragmentary top view of the first preferred embodiment when applied to clean a conveyer belt.

Referring to FIG. 5, the web part 422 includes a proximal part 422' extending away from the mounting part 421 in a first oblique direction, and a distal part 422" extending in a second oblique direction. The first and second oblique directions intersect each other and are oblique to both of the transverse and longitudinal directions. The web part 422 is curved between the proximal and distal parts 422', 422" and makes a U-turn between the proximal and distal parts 422', 422". An imaginary line "I" passing through a point "A" on the top end of the mounting part 421 and a point "C" on the top end of the free edge 423 cooperates with the longitudinal direction (shown as an arrow in FIG. 5) of the conveyer belt 51 to define an angle θ smaller than 90°.

The scraping plates 42 are made of an elastomeric material. Therefore, the free edge 423 of the web part 422 is resiliently movable toward and away from the positioning member 41, and the distal part 422" of the web part 422 is resiliently movable toward and away from the positioning member 41.

Referring again to FIG. 4, each of the scraping plates 42 further includes a retaining member 425 fixed to the mounting part 421 and sleeved on the positioning member 41. Each of the retaining member 425 and the positioning member 41 has a four-sided cross-section, which can avoid the scraped material from accumulating thereon.

Referring again to FIG. 5, since each of the scraping plates 42 is formed in the shape of a substantially U-shaped curve, the area of the scraping edge 424 for contacting the material to be scraped is increased. For example, when the material to be scraped is conveyed along the longitudinal direction shown by the arrow in FIG. 5, it can pass two scraping points (A), (B) of the scraping edge 424. Therefore, the scraping device 4 of this invention enhances the scraping efficiency, especially when applied to scrape the moist material from the conveyer belt 51. Furthermore, since each of the scraping plates 42 is resiliently movable toward and away the positioning member 41, the lower returning section 53 of the conveyer belt 51 will be slightly vibrated, which in turn enhances removal of the scraped material from the conveyer belt 51.

In this preferred embodiment, it is not required to use electric power to actuate the scraping device 4 according to this invention. Furthermore, the scraping device 4 can be applied to effectively clean a conveyer belt conveying in reversible conveying directions. Therefore, the scraping device 4 according to this invention enhances the scraping efficiency as compared to the prior art.

Figure 6:
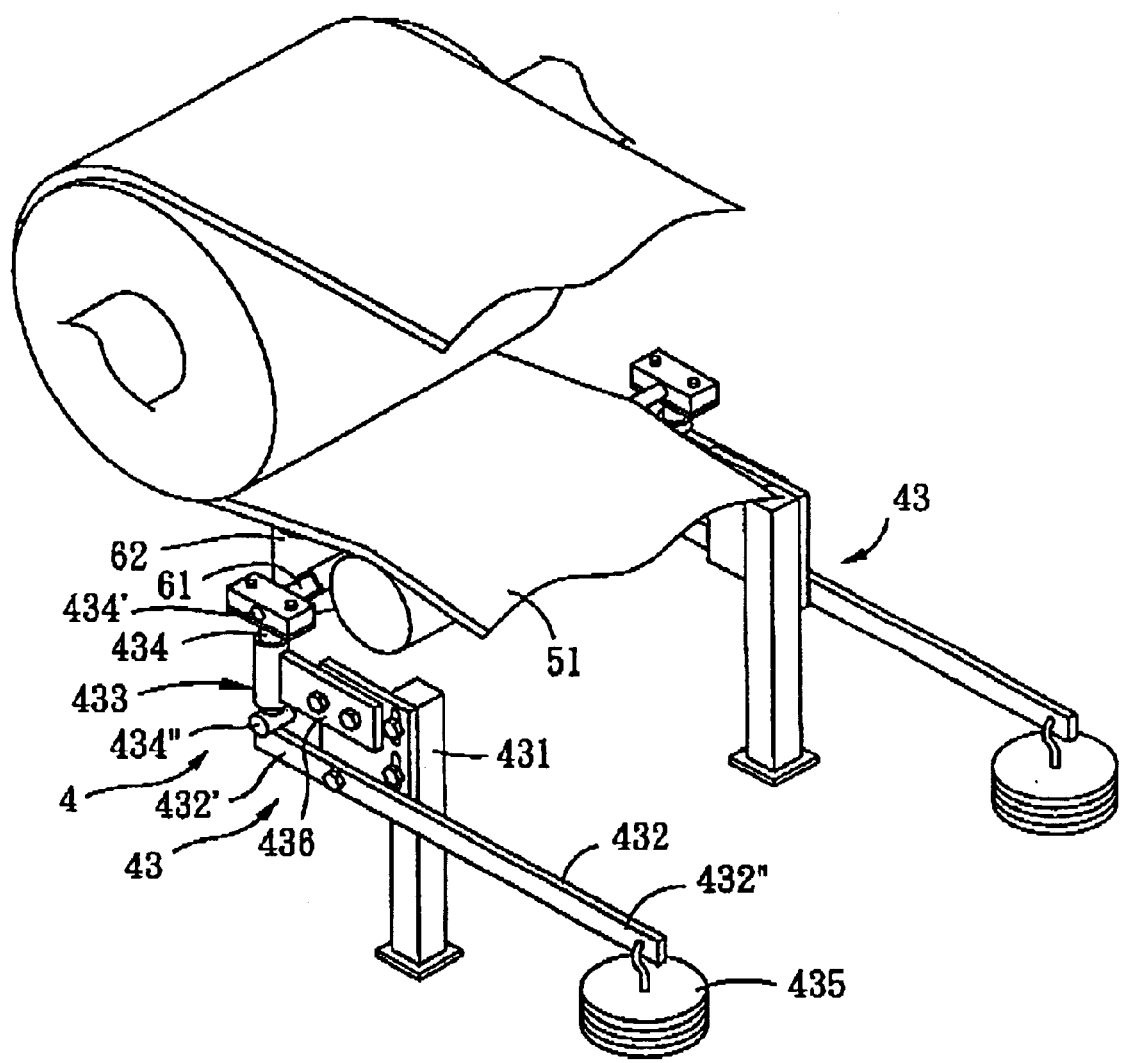
FIG. 6 is a fragmentary perspective view of the second preferred embodiment of the scraping device according to this invention when applied to clean a conveyer belt.

Referring to FIG. 6, the second preferred embodiment of the scraping device 4 according to this invention is substantially identical to the first preferred embodiment in construction, except that the former further includes a pair of support units 43 supporting two opposite ends of the positioning member 61. Each of the support units 43 has a biasing unit to bias upward the positioning member 61 so that the top scraping edge (not shown in the figure) of the web part 62 is in contact with the conveyer belt Si. Each of the support units 43 includes a leg 431, and a bar 432 mounted pivotally on the leg 431. The bar 432 has one end 432' supporting the positioning member 61 and another end 432" provided with a counterweight 435 which serves as the biasing unit to bias upward the positioning member 61. Each of the support units 43 further includes a horizontal connecting member 436 fixed to the leg 431 and extending away from the leg 431 above the bar 432, a vertical guide sleeve 433 fixed to the connecting member 436 opposite to the leg 431, and a core 434 which is movable upward and downward within the guide sleeve 433 and which has an upper end 434' connected to the positioning member 61 and a lower end 434" supported by the bar 432 opposite to the counterweight 435. The upper end 434' of the core 434 is connected to the end of the positioning member 61 by any suitable manner, such as with the used of screws.

Figure 7:
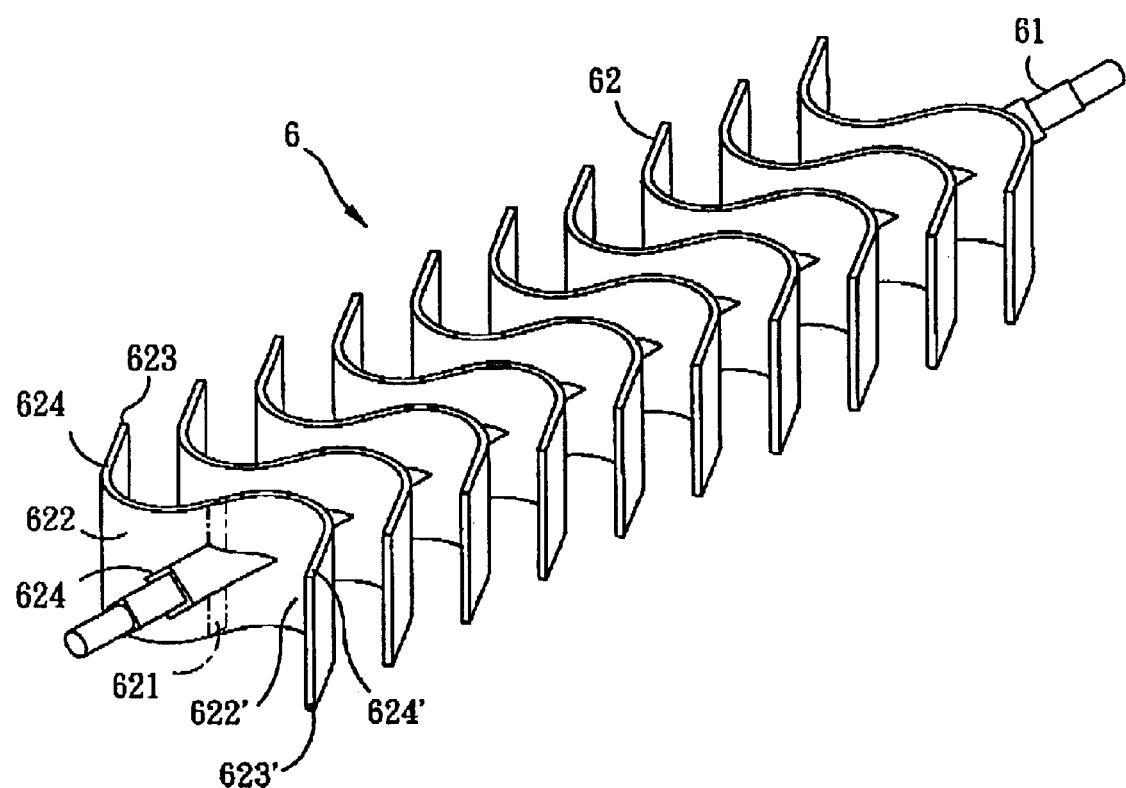
FIG. 7 is a perspective view of the third preferred embodiment of the scraping device according to this invention.

Referring to FIG. 7, the third preferred embodiment of the scraping device 6 according to this invention is substantially similar to this first preferred embodiment in construction, except that each of the scraping plates 62 includes a pair of the web parts 622, 622'. The proximal parts 623, 623' of the web parts 622, 622' extend oppositely from the mounting part 621. The top scraping edges 624, 624' of the web parts 622, 622' are flush with each other and form a substantially S-shaped curve. Similar to the first preferred embodiment, each of the retaining member 624 and the positioning member 61 in the third preferred embodiment also has a four-sided cross-section.

Figure 8:
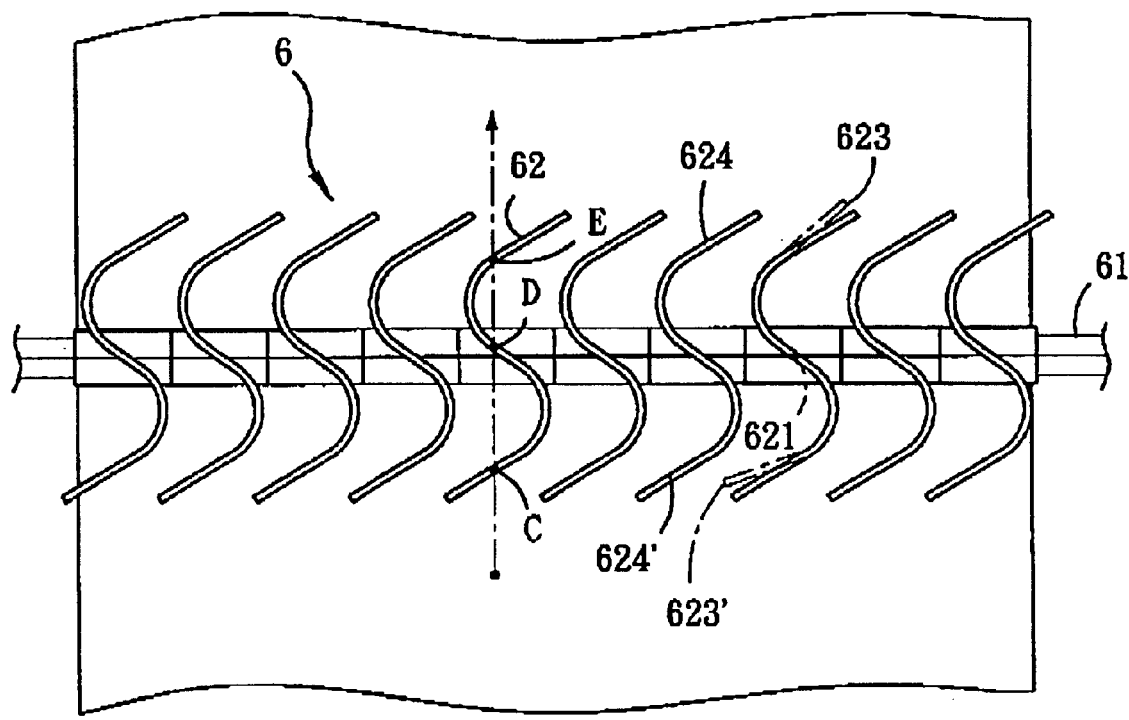
FIG. 8 is a fragmentary top view of the third preferred embodiment when applied to clean a conveyer belt.

Referring to FIG. 8, since each of the scraping plates 42 is formed in the shape of a substantially S-shaped curve, the area of the scraping edges 624, 624' for contacting the material to be scraped is further increased. For example, .when the material to be scraped is conveyed along the longitudinal direction shown by the arrow in the figure, it can pass three scraping points (C), (D) and (E) of the scraping edges 624, 624'. Therefore, the scraping efficiency is further improved.

Figure 9:
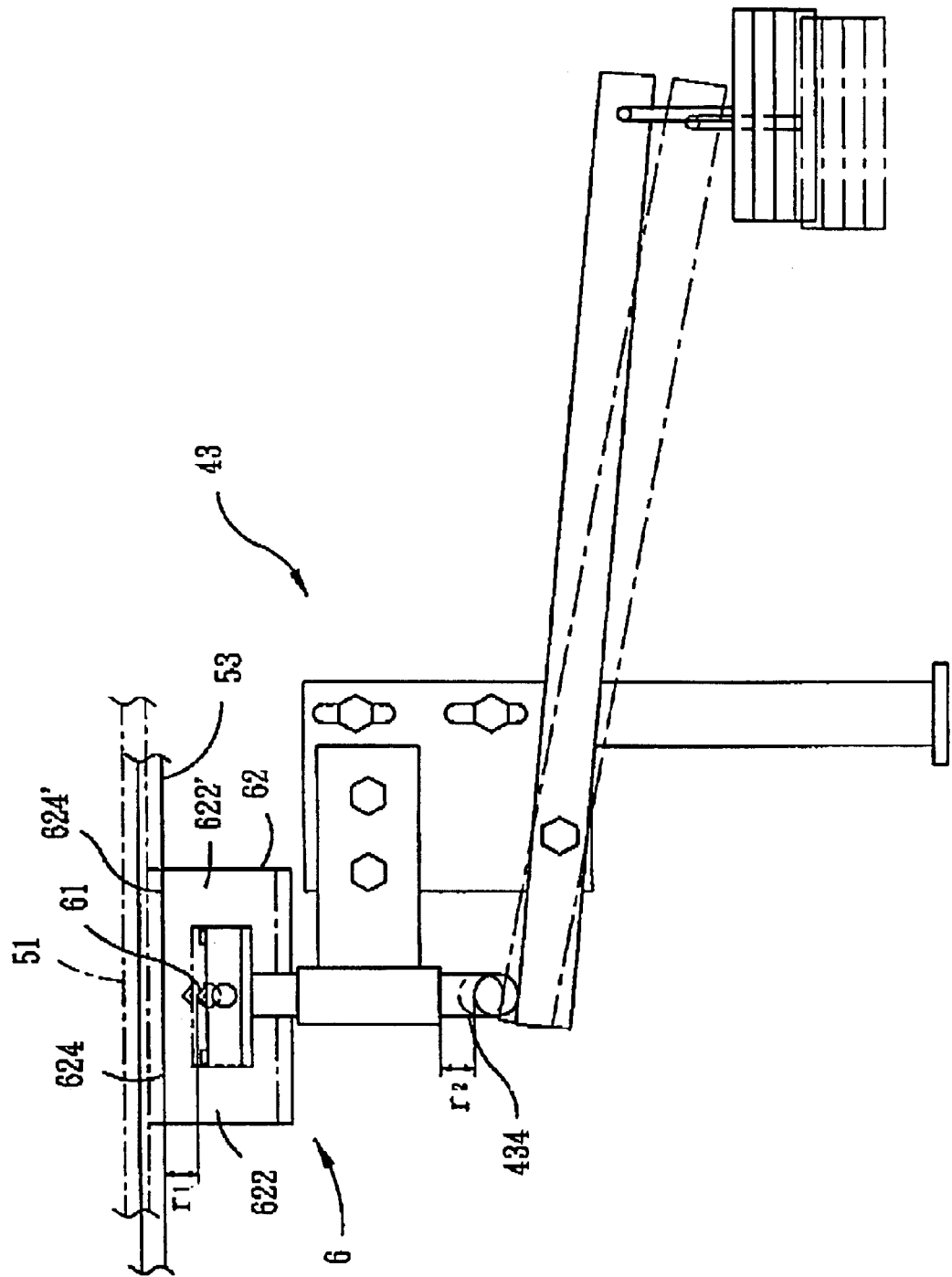
FIG. 9 is a fragmentary schematic view of the fourth preferred embodiment of the scraping device when applied to clean a conveyer device.

Referring to FIG. 9, the fourth preferred embodiment of the scraping device 6 according to this invention is substantially identical to the third preferred embodiment in construction, except that the former further includes the support units 43 as used in the second preferred embodiment. The top scraping edge 624 (624') of the web part 622 (622') is higher than a top end of the positioning member 61. The height (indicated as r1 in FIG. 9) of the top scraping edge 624 (624') of the web part 622 (622') from the top end of the positioning member 61 is equal to a greatest vertical displacement (indicated as r2 in FIG. 9) of the core 434. Therefore, when r1=r2=0, which means the side of the scraping plate 62 abutting against the lower returning section 53 of the conveyer belt 51 is worn out, the scraping plates 62 can be simply rotated at an angle of 180° so as to abut the other side of each of the scraping plates 62 against the lower returning section 53 of the conveyer belt 51 to continue the cleaning operation.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A scraping device adapted for cleaning a conveyer belt having an upper forwarding section and a lower returning section, comprising:

an elongated positioning member adapted to be mounted under the lower returning section in a transverse direction transverse to a longitudinal direction of the conveyer belt; and a plurality of scraping plates, each of which includes a mounting part mounted on said positioning member, and at least one web part having a free edge distal from said mounting part, said web part extending between said mounting part and said free edge and being inclined with respect to said transverse and longitudinal directions, said web part further having a top scraping edge adapted to scrape the conveyer belt;

wherein said web part includes a proximal part extending away from said mounting part in a first oblique direction, and a distal part extending in a second oblique direction, said first and second oblique directions intersecting each other and being oblique to both of said transverse and longitudinal directions, said web part being curved between said proximal and distal parts.

2. The scraping device as claimed in claim 1, wherein said web part substantially makes a U-turn between said proximal and distal parts.

3. The scraping device as claimed in claim 2, wherein each of said scraping plates includes a pair of said web parts, said proximal parts of said web parts extending oppositely from said mounting part, said top scraping edges of said web parts being flush with each other and forming a substantially S-shaped curve.

4. A scraping device adapted for cleaning a conveyer belt having an upper forwarding section and a lower returning section, comprising:

an elongated positioning member adapted to be mounted under the lower returning section in a transverse direction transverse to a longitudinal direction of the conveyer belt; and a plurality of scraping plates, each of which includes a mounting part mounted on said positioning member, and at least one web part having a free edge distal from said mounting part, said web part extending between said mounting part and said free edge and being inclined with respect to said transverse and longitudinal directions, said web part further having a top scraping edge adapted to scrape the conveyer belt;

wherein said web part includes a proximal part extending away from said mounting part in a first oblique direction, and a distal part extending in a second oblique direction, said first and second oblique directions intersecting each other and being oblique to both of said transverse and longitudinal directions, said web part being curved between said proximal and distal parts;

wherein said web part substantially makes a U-turn between said proximal and distal parts; and wherein said distal part is resiliently movable toward and away from said positioning member.

5. A scraping device adapted for cleaning a conveyer belt having an upper forwarding section and a lower returning section, comprising:

an elongated positioning member adapted to be mounted under the lower returning section in a transverse direction transverse to a longitudinal direction of the conveyer belt;

a plurality of scraping plates, each of which includes a mounting part mounted on said positioning member, and at least one web part having a free edge distal from said mounting part, said web part extending between said mounting part and said free edge and being inclined with respect to said transverse and longitudinal directions, said web part further having a top scraping edge adapted to scrape the conveyer belt; and a pair of support units for supporting two opposite ends of said positioning member, each of said support units having a biasing unit to bias upward said positioning member so that said top scraping edge of said web part is adapted to contact the conveyer belt;

wherein each of said support units includes a leg, and a bar mounted pivotally on said leg, said bar having one end supporting said positioning member and another end provided with a counterweight which serves as said biasing unit to bias upward said positioning member.

6. The scraping device as claimed in claim 5, wherein each of said support units further includes a horizontal connecting member fixed to said leg and extending away from said leg above said bar, a vertical guide sleeve fixed to said connecting member opposite to said leg, and a core which is movable upward and downward within said guide sleeve and which has an upper end connected to said positioning member and a lower end supported by said bar opposite to said counterweight.

7. The scraping device as claimed in claim 6, wherein said top scraping edge of said web part is higher than a top end of said positioning member.

8. The scraping device as claimed in claim 7, wherein the height of said top scraping edge of said web part from said top end of said positioning member is equal to a greatest vertical displacement of said core.

\* \* \* \* \*